(12) United States Patent
Youngblood

(10) Patent No.: US 11,785,891 B2
(45) Date of Patent: Oct. 17, 2023

(54) CUTTER IMPLEMENT HAVING A CROP PUSHING SYSTEM

(71) Applicant: DEERE & COMPANY, Moline, IL (US)

(72) Inventor: Kyle R. Youngblood, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 482 days.

(21) Appl. No.: 17/070,347

(22) Filed: Oct. 14, 2020

(65) Prior Publication Data

US 2022/0110260 A1 Apr. 14, 2022

(51) Int. Cl.
*A01D 57/01* (2006.01)
*A01D 57/22* (2006.01)

(52) U.S. Cl.
CPC .............. *A01D 57/01* (2013.01); *A01D 57/22* (2013.01)

(58) Field of Classification Search
CPC ................................ A01D 57/01; A01D 57/22
See application file for complete search history.

(56) References Cited

U.S. PATENT DOCUMENTS

| | | | |
|---|---|---|---|
| 3,014,326 A * | 12/1961 | Fulton | A01D 57/00 56/DIG. 1 |
| 3,306,015 A | 2/1967 | Myers | |
| 3,513,647 A * | 5/1970 | Johnston | A01D 43/10 56/219 |
| 3,940,910 A | 3/1976 | d'Acremont | |
| 4,499,711 A | 2/1985 | McLean | |
| 5,943,850 A * | 8/1999 | Rourke | A01D 91/04 56/189 |
| 7,644,567 B2 | 1/2010 | Blakeslee et al. | |
| 2007/0204587 A1* | 9/2007 | Rosenbalm | A01D 57/01 56/119 |
| 2008/0098704 A1* | 5/2008 | Dairon | A01D 57/01 56/11.9 |
| 2009/0272090 A1 | 11/2009 | Blakeslee et al. | |
| 2011/0154793 A1* | 6/2011 | Ernst | A01D 43/082 56/94 |
| 2012/0011820 A1* | 1/2012 | Olander | A01D 57/00 56/17.3 |
| 2022/0110261 A1* | 4/2022 | Youngblood | A01D 57/01 |

FOREIGN PATENT DOCUMENTS

| | | |
|---|---|---|
| AU | 2010237072 A1 | 12/2011 |
| CA | 2272198 A1 | 11/2000 |
| WO | WO-2022015360 A1 * | 1/2022 ............ A01D 34/62 |

OTHER PUBLICATIONS

Extended European Search Report and Written Opinion issued in European Patent Application No. 21197861.4, dated Feb. 18, 2022, in 08 pages.

* cited by examiner

*Primary Examiner* — Alicia Torres

(57) ABSTRACT

A cutter implement for cutting crop material includes a housing, a cutter, and a push-bar. The housing has a forward end for engaging the crop material when moving in a direction of operation. The housing at least partially defines a cutting region disposed at the forward end thereof. The cutter is coupled to the housing and is operable to cut the crop material in the cutting region. The push-bar is positioned forward of the cutter relative to the direction of operation. The push-bar is operable to lean the crop material in a forward direction relative to the direction of operation. The push-bar is adjustable in a vertical direction relative to a ground surface.

16 Claims, 7 Drawing Sheets

CUTTER IMPLEMENT HAVING A CROP PUSHING SYSTEM

RELATED APPLICATIONS

N/A.

FIELD OF THE DISCLOSURE

The present disclosure relates generally to a cutter implement for cutting crop material.

BACKGROUND OF THE DISCLOSURE

Forages, such as grasses, legumes, maize, and other crop residues, are commonly cut by a cutter implement, such as but not limited to, a mower or mower-conditioner. The types of crops harvested vary widely from short crops that are compliant and flexible to tall crops that are relatively ridged and inflexible. As a general rule however, taller crops are typically more stiff/rigid than short crops so as to stand steadily on the ground. For some crops, it may be preferred for the cutter implement to cut the crop when the crop has a slight lean forward relative to the direction of operation of the cutter implement.

SUMMARY OF THE DISCLOSURE

According to an aspect of the present disclosure, a cutter implement for cutting crop material is provided. The cutter implement includes a housing, a cutter, and a push-bar. The housing has a forward end for engaging the crop material when moving in a direction of operation. The housing at least partially defines a cutting region disposed at the forward end thereof. The cutter is coupled to the housing and is operable to cut the crop material in the cutting region. The push-bar is positioned forward of the cutter relative to the direction of operation. The push-bar is operable to lean the crop material in a forward direction relative to the direction of operation. The push-bar is adjustable in a vertical direction relative to a ground surface.

In one aspect of the present disclosure, the cutter implement further includes a curtain coupled to the forward end of the housing. The curtain is positioned forward of the push-bar relative to the direction of operation. The curtain at least partially defines the cutting region.

In one aspect of the present disclosure, the curtain is moveable in a rearward direction relative to the direction of operation.

In one aspect of the present disclosure, the push-bar is positioned rearward of the curtain a pre-determined distance to engage the curtain in response to the curtain moving rearward relative to the direction of operation the pre-determined distance, such that the push-bar increases a resistance of the curtain against rearward movement after the curtain contacts the push-bar.

In one aspect of the present disclosure, the cutter implement further includes an actuator coupled to the push-bar and operable to move the push-bar in the vertical direction.

In one aspect of the present disclosure, the actuator includes, but is not limited to, one of a hydraulic cylinder, an electric motor, a hydraulic motor, or a pneumatic motor.

In one aspect of the present disclosure, the housing includes an upper frame portion, a first lateral frame portion, and a second lateral frame portion, with the first lateral frame portion and the second lateral frame portion spaced apart from each other and disposed on opposing lateral sides of the housing relative to a central longitudinal axis of the housing.

In one aspect of the present disclosure, the cutter implement further includes a connector interconnecting the actuator and the push-bar.

In one aspect of the present disclosure, the connector includes, but is not limited to, one of a cable, a chain, a rod, or a bar.

In one aspect of the present disclosure, the cutter implement further includes a pulley coupled to the housing and configured to re-direct the connector between the actuator and the push-bar.

In one aspect of the present disclosure, the cutter implement further includes a linear support element interconnecting the housing and the push-bar and operable to restrict movement of the push-bar in a rearward direction relative to the direction of operation.

In one aspect of the present disclosure, the linear support element includes a first end coupled to the housing adjacent the forward end of the housing and forward of the push bar relative to the direction of operation, and a second end coupled to the push-bar rearward of the first end relative to the direction of operation.

In one aspect of the present disclosure, the linear support element includes, but is not limited to, one of a chain, a cable, a rod, a strap, or a bar.

In one aspect of the present disclosure, the actuator is a hydraulic cylinder having a rod end connected to the push-bar and configured to extend and retract to move the push bar in the vertical direction.

In one aspect of the present disclosure, the cutter implement further includes a crop processor positioned rearward of the cutter relative to the direction of travel and operable to condition cut crop material.

A crop pushing system for a cutter implement is provided. The cutter implement includes a housing and a cutter coupled to the housing and operable to cut the crop material. The system includes a push-bar and an actuator. The push-bar is positioned forward of the cutter relative to a direction of operation. The push-bar is operable to lean the crop material in a forward direction relative to the direction of operation. The actuator is coupled to the push-bar and is operable to move the push-bar in a vertical direction relative to the ground surface.

In one aspect of the present disclosure, the crop pushing system further includes a curtain positioned forward of the push-bar relative to the direction of operation, with the curtain at least partially defining a cutting region.

In one aspect of the present disclosure, the curtain is moveable in a rearward direction relative to the direction of operation, the push-bar is positioned rearward of the curtain a pre-determined distance to engage the curtain in response to the curtain moving rearward relative to the direction of operation the pre-determined distance, such that the push-bar increases a resistance of the curtain against rearward movement after the curtain contacts the push-bar.

In one aspect of the present disclosure, the crop pushing system further includes a linear support element attached to the push-bar and operable to restrict movement of the push-bar in a rearward direction relative to the direction of operation.

In one aspect of the present disclosure, the actuator is a hydraulic cylinder having a rod end connected to the push bar and configured to extend and retract to move the push bar in the vertical direction.

Other features and aspects will become apparent by consideration of the detailed description and accompanying drawings.

BRIEF DESCRIPTION OF THE DRAWINGS

The detailed description of the drawings refers to the accompanying figures.

DETAILED DESCRIPTION OF THE DRAWINGS

Figure 1:
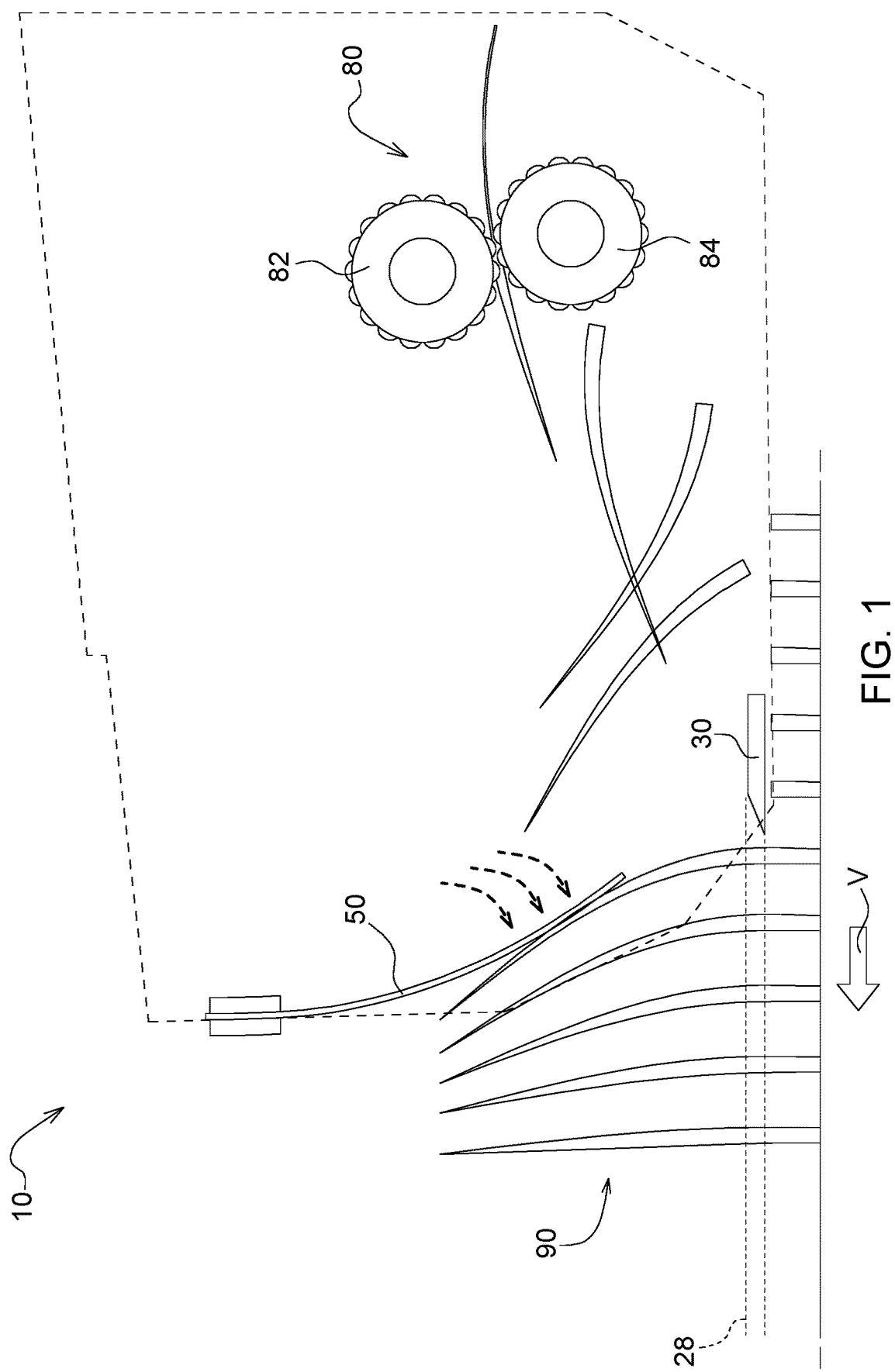
FIG. 1 is a diagrammatic view illustrating the crop leaning forward slightly for a cutting implement to cut.
Figure 2:
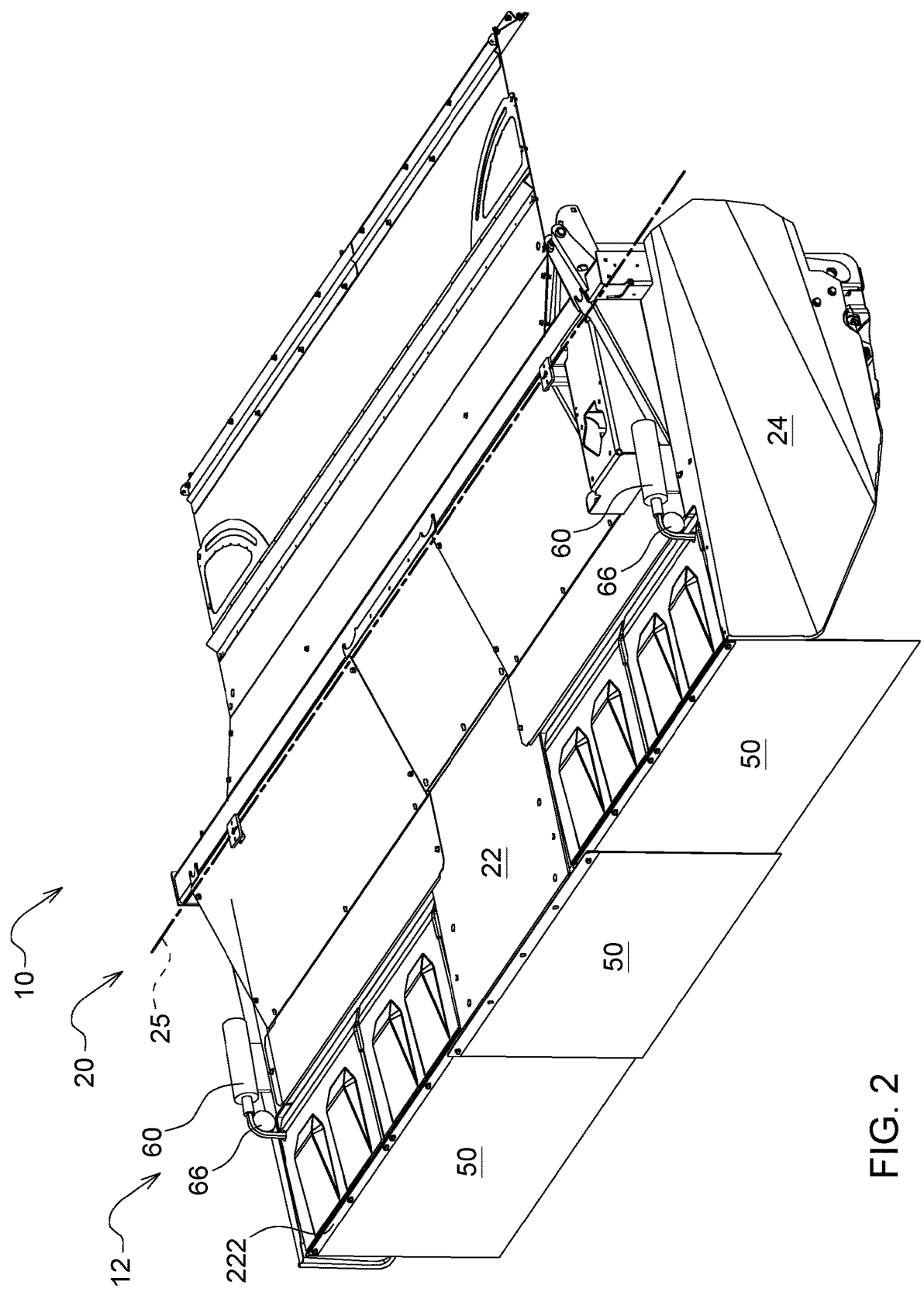
FIG. 2 is a schematic perspective view of the cutter implement showing a first implementation.
Figure 3:
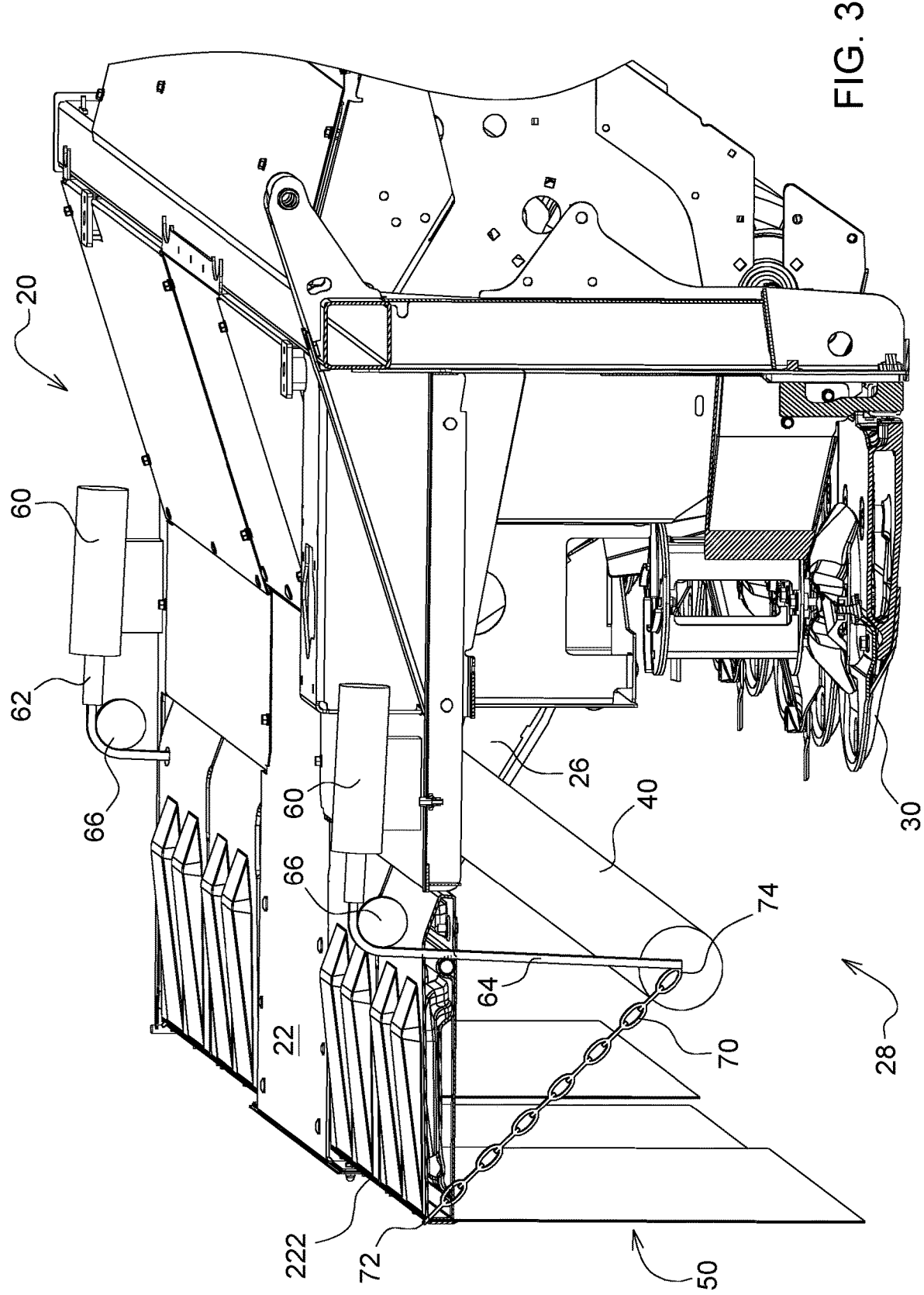
FIG. 3 is another schematic perspective view of the cutter implement as shown in FIG. 2.

Referring to FIG. 1, a cutter implement 10 include a cutter 30 extending in a forward direction relative to the direction of the operation V, which is the travel direction. For clarity, a housing 20 of the cutter implement 10 is omitted in FIG. 1 but is shown in FIGS. 2 and 3. A cutting region 28 is defined in front of the cutter 30. Optionally, a crop processor 80 is positioned rearward of the cutter relative to the direction of operation (travel) and operable to condition cut crop material 90. The crop processor 80 in one implementation includes a first conditioning roll 82 and a second conditioning roll 84 engaging with each other to condition the crop material 90. However, it should be appreciated that the crop processor 80 may be implemented in another configuration not shown or described herein that is capable of processing cut crop as understood by those skilled in the art. The cutter implement 10 may include, but is not limited to, a mower and a mower-conditioner. The mower and/or mower conditioner may be drawn by a vehicle, such as but not limited to a tractor or other similar vehicle, or may be a self-propelled implement having motive power, steering systems, control systems, etc.

Leaning the crop 90 forward may provide several benefits for crop cutting and crop conditioning process. For example, it may allow the base end of the stems to be fed into the first conditioning roll 82 and the second conditioning roll 84 as shown in FIG. 1. Feeding the crop (material) 90 into the crop processor 80 in this manner has shown to improve cutting performance by minimizing re-cutting at the cutter 30 and it improves cut height uniformity. However, the degree to which the crops 90 are flexed forward greatly affects how much the performance can be improved. In fact, if the crop 90 is over-flexed it may hinder cutting performance.

Therefore, to achieve the improvement in cutting and conditioning performance, the crop 90 may be flexed forward "slightly" so that the stem remains intact and erect but not "over-bent" such that the stem is kinked/yielded, causing the crop to permanently tip or lay on the ground prior to being severed. In general, taller crops are typically more stiff/rigid than short crops. Therefore, a bending force required to bend rigid taller crops forward may need to be stronger than the bending force required to bend shorter more compliant crops forward. The present disclosure includes a cutter implement and a crop pushing system thereof, which have elements operable to adjust the height of the force applied to the crop and/or an amount of force applied to the crop.

In the first embodiment, as shown in FIGS. 2-5, the cutter implement 10 may include a housing 20, the cutter 30, a push-bar 40, and a curtain 50. It is noted that in one implementation, the push bar 40 engages with the curtain 50 and applies a force on the crop 90. In another implementation, which is not shown, the push-bar may directly apply a force on the crop 90 without the curtain 50.

The housing 20 includes an upper frame portion 22, a first lateral frame portion 24, and a second lateral frame portion 26. The first lateral frame portion 24 and the second lateral frame portion 26 are spaced apart from each other and disposed on opposing lateral sides of the housing 20 relative to a central longitudinal axis 25 of the housing 20. The housing 20 also has a forward end 222, included by the upper frame portion 22 in this implementation, for engaging the crop material 90 when moving in a direction of operation V. The housing 20 at least partially defines the cutting region 28 disposed at or near the forward end 222.

The cutter 30, as shown in FIGS. 2 and 3, is coupled to the housing 20 and is operable to cut the crop material 90 in the cutting region 28. In the first implementation, the cutter 30 is configured as a cutter-bar extending laterally transverse relative to the central longitudinal axis 25 of the housing 20, across a width of the cutter implement 10.

The push-bar 40 is positioned forward of the cutter 30 relative to the direction of operation V. The push-bar 40 is operable to lean the crop material 90 in a forward direction relative to the direction of operation V. The push-bar 40 is adjustable in a vertical direction relative to a ground surface by actuator(s) 60, which will be described in greater detail below.

The curtain 50 is coupled to the forward end 222 of the housing 20 and is positioned forward of the push-bar 40 relative to the direction of operation V, as shown in FIG. 2. The curtain 50 at least partially defines the cutting region 28. As shown in FIGS. 2 and 3, the curtain 50 may include three sections. The middle section has an offset to two adjacent sections. The curtain 50 is moveable in a rearward direction relative to the direction of operation V. When the cutter implement 10 moves in the direction of operation V, the curtain 50 contacts the crop 90 and may be moved in the rearward direction due to the stiffness of the crop 90. The crop 90 may be simultaneously flexed forward due to the force applied from the curtain 50. The weight of the curtain 50 may drag the curtain 50 toward its original position, which provides a resistance of curtain 50 against rearward movement after the curtain 50 contacts the crop 90.

Figure 5:
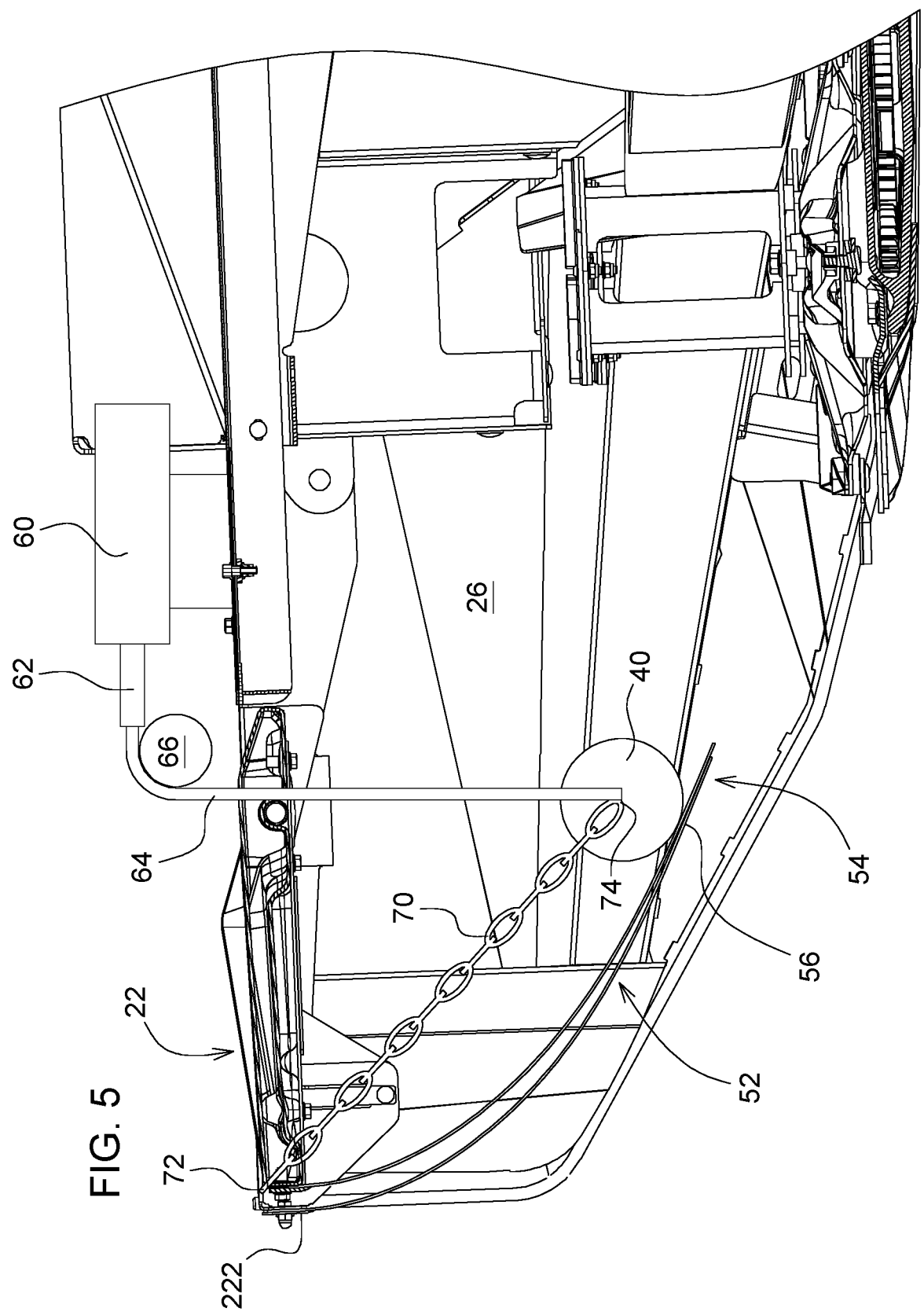
FIG. 5 is another schematic side view of the cutter implement showing the first implementation when the curtain engages a push bar.

The push-bar 40 is positioned rearward of the curtain 50 a pre-determined distance 45 to engage the curtain 50 in response to the curtain 50 moving rearward relative to the direction of operation V the pre-determined distance 45. As such, the push-bar 40 increases the resistance of the curtain 50 against rearward movement after the curtain 50 contacts the push-bar 40. As shown in FIG. 5, when the curtain 50 moves rearward to contact the push-bar 40 at an engaging portion 56 of the curtain 50, the engaging portion 56 defines a first portion 52 above the engaging portion 56 and a second portion 54 below the engaging portion 56. The engaging portion 56 may be movable on the curtain 50, depending on the position of the push-bar 40, which is moved by an actuator(s) 60. The push-bar 40 in the first implementation is a cylinder shape but could be other shapes, including but not limited to, a triangular prism, a rectangular prism, etc.

In another implementation of the first implementation (not shown), the push-bar 40 is positioned rearward of the forward end 222 a pre-determined distance (not shown) to engage the crop 90 directly when the cutter implement 10 travels in the direction of operation V. As such, the push-bar 40 provides a resistance against the crop 90 to lean the crop 90 forward.

Figure 4:
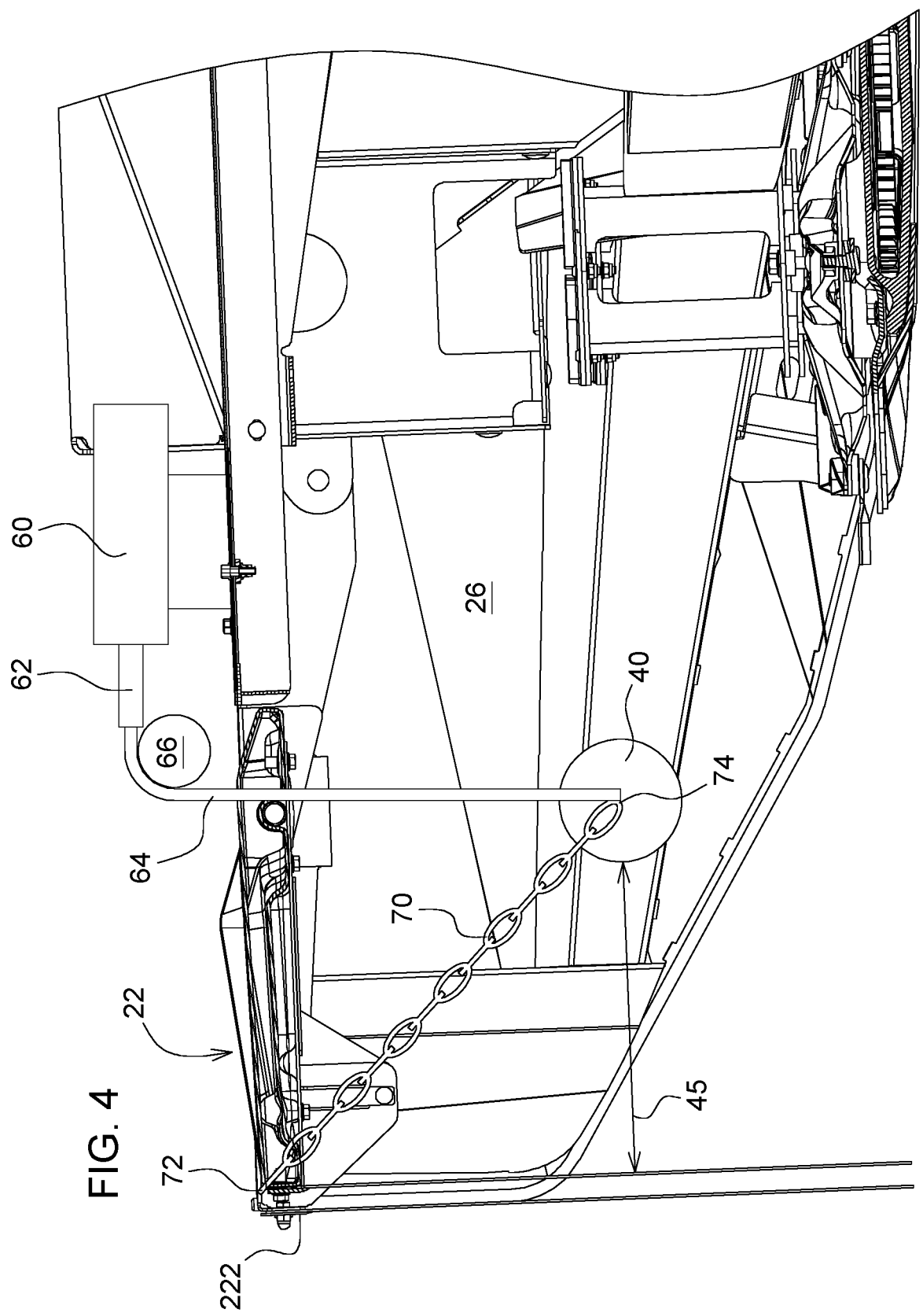
FIG. 4 is a schematic side view of the cutter implement as shown in FIG. 3.

The cutter implement 10, in the first implementation shown in FIGS. 2, 3 and 4, also includes two actuators 60, each of which is coupled to an end of the push-bar 40 and operable to move the push-bar 40 in the vertical direction relative to the ground surface. Each actuator 60 may include, but is not limited to, a hydraulic cylinder, an electric motor, a hydraulic motor, and/or a pneumatic motor. In the first implementation, the actuators 60 are hydraulic cylinders, and the two actuators 60 are coupled to the upper frame portion 22. One actuator 60 is disposed near the first lateral frame portion 24 and the other actuator 60 is disposed near the second lateral frame portion 26. Each actuator 60 includes a rod end 62 configured to extend or retract parallel to the upper frame portion 22 and parallel to the direction of operation V.

The cutter implement 10 also includes two connectors 64, each of which interconnects one rod end 62 of the actuators 60 and one end of the push-bar 40. Each connector 64 may include, but is not limited to, one of a cable, a chain, a rod, a bar, or some other similar structure. In this embodiment, the connectors 64 are cables. Two pulleys 66, each of which is coupled to the upper frame portion 22 of the housing 20 and is configured to re-direct the connector 64 between the rod end 62 of the actuator 60 and one end of the push-bar 40. When rod ends 62 of the actuators 60 extend or retract parallel to the upper frame portion 22, the connectors 64 (cables) are re-directed to move the push-bar 40 vertically relative to the ground surface via the pulleys 66. The engaging portion 56 of the curtain 50 is therefore moveable with the movement of the actuators 60 while the curtain 50 engages with the push-bar 40.

In response to the curtain 50 moving rearward relative to the direction of operation V when the cutter implement 10 moves forward, the push-bar 40 may be moved rearward relative to the direction of operation V, because it is hung from the free ends of the connectors 64. In another implementation without the curtain (not shown) in response to the reaction directly from the crop 90) when the cutter implement 10 moves forward relative to the direction of operation V, the push-bar 40 may be moved rearward relative to the direction of operation V. However, because of the gravity, the weight of the push-bar 40 urges or biases the push-bar 40 back to the original position, i.e., hanging vertically straight for example. As such, the weight of the push-bar 40 acted upon by gravity generates the force that is applied to the crop and which may lean the crop 90 forward. The weight of the push-bar 40 may be one of the factors to determine the direction and strength of the force. The first implementation also demonstrates two linear support elements 70, which can be another factor that affects or determine the direction and strength of the force (resistance) from the push-bar 40 against the curtain 50 or crop 90.

The cutter implement 10 may include the linear support elements 70, each of which is interconnecting the housing 20 and the push-bar 40 and operable to restrict movement of the push-bar 40 in a rearward direction relative to the direction of operation V. Each linear support element 70 includes a first end 72 coupled to the housing 20 adjacent the forward end 222 thereof and forward of the push-bar 40 relative to the direction of operation V. Each linear support element 70 also includes a second end 74 coupled to the push-bar 40 rearward of the first end 72 relative to the direction of operation V. In such configuration, each linear support element 70 may provide a force on the push-bar 40 directed at least partially forward relative to the direction of operation V, such that the push-bar 40 may increase resistance of the curtain 50 more than without the linear support elements 70, after the curtain 50 contacts the push-bar 40. In another implementation (not shown), each linear support element 70 may provide the force on the push-bar 40 at least partially upward relative to the ground to undertake some weight of the push-bar 40 and affect the force (resistance) from the push-bar 40 against the curtain 50 or the crop 90. The location of the first end 72 of the linear support element 70 between the curtain 50 (or the forward end 222) and the push-bar 40 may partially determine the direction and the strength of force applied on the push-bar 40. The linear support element 70 may include, but is not limited to, one of a chain, a cable, a rod, a strap, a bar, or some other similar structure.

Figure 6:
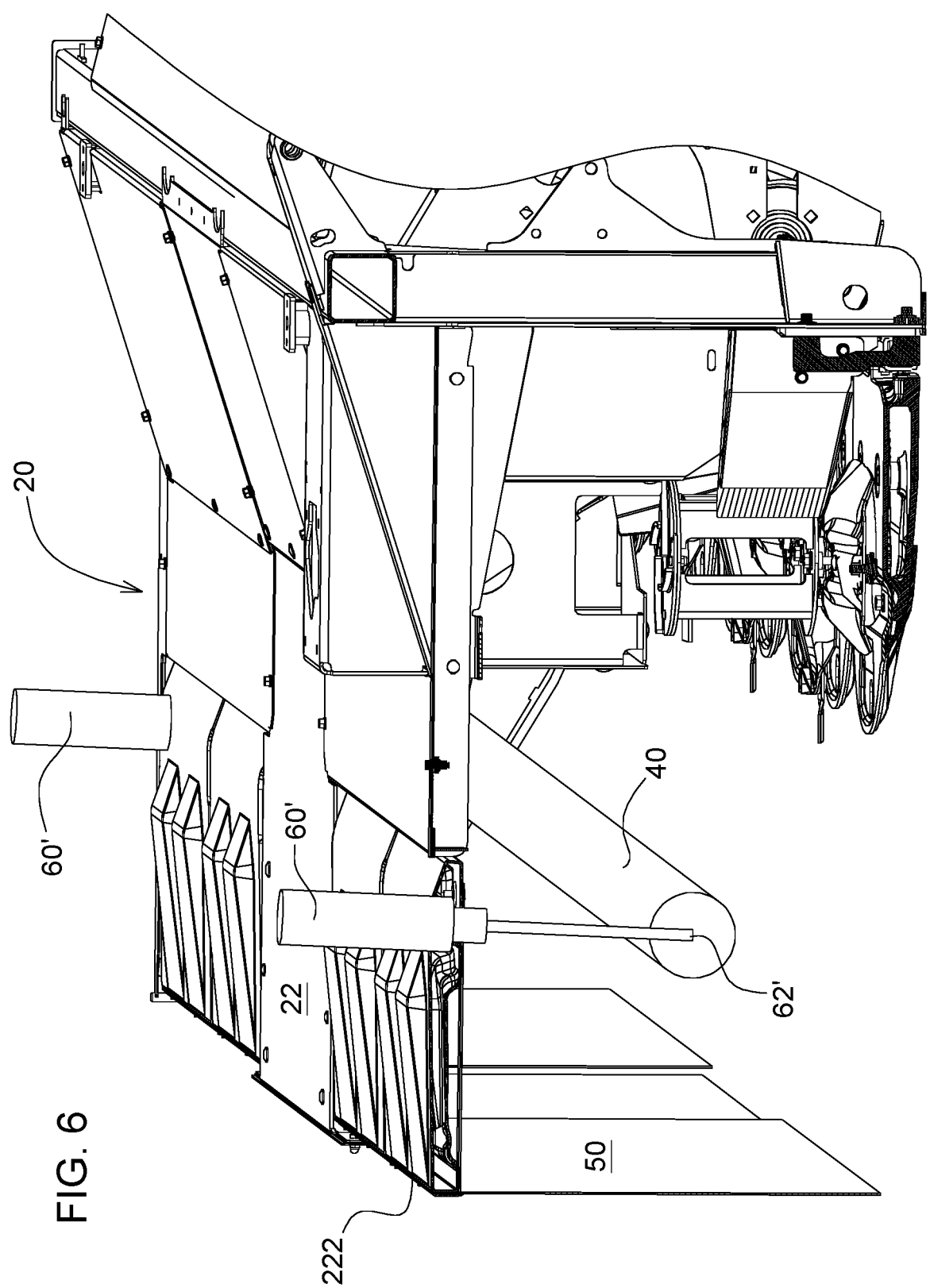
FIG. 6 is a schematic perspective view of the cutter implement showing a second implementation.
Figure 7:
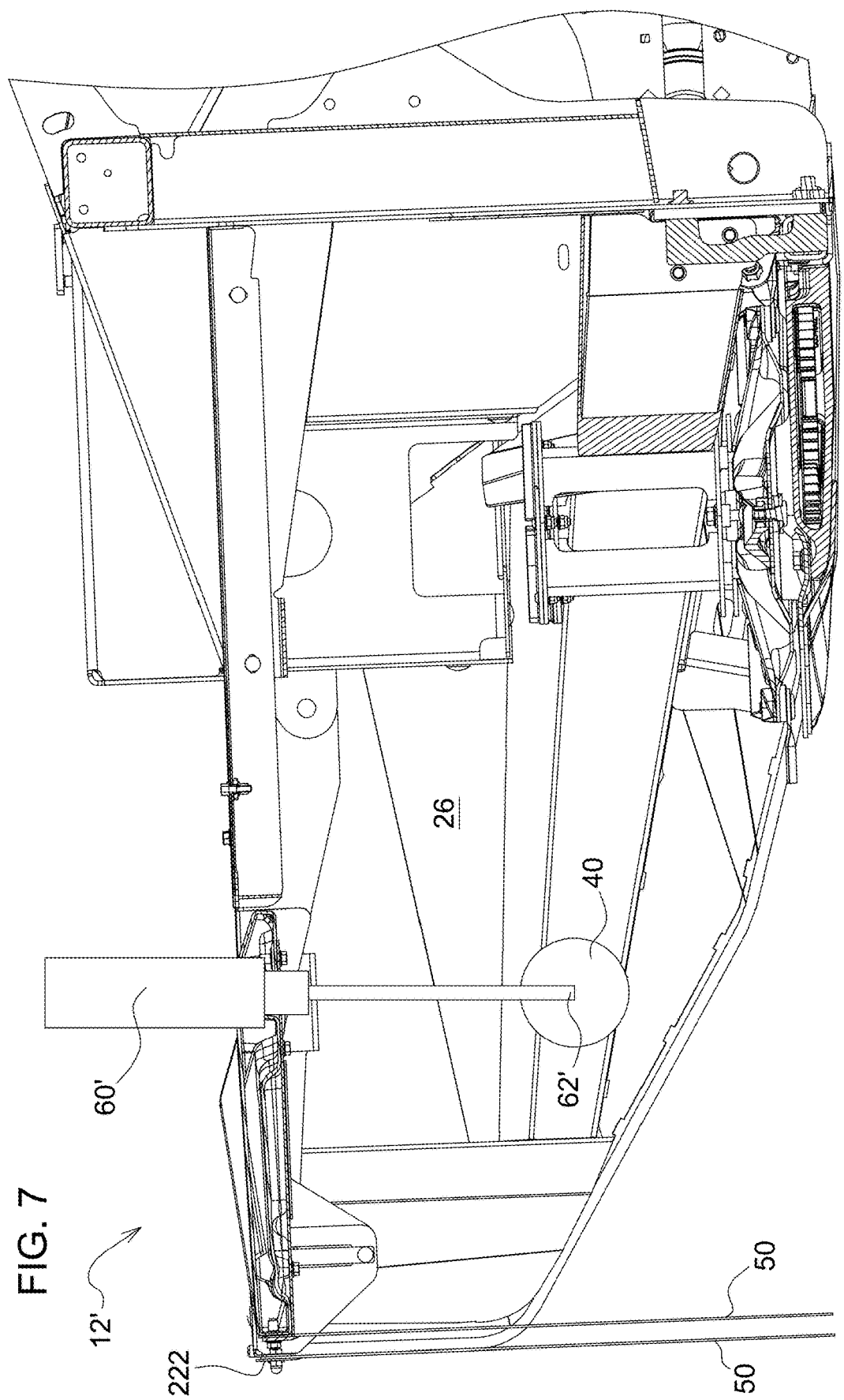
FIG. 7 is a schematic side view of the cutter implement as shown in FIG. 6.

Referring to FIGS. 6 and 7, in the second implementation, actuators 60' are hydraulic cylinders coupled to the upper frame portion 22 of the housing 20. Each actuator 60' has a rod end 62' directly connected to one end of the push-bar 40 and is configured to extend and retract to move the push-bar 40 at least in the vertical direction relative to the ground surface. Because each of the push-bar 40 is directly connected to one of the rod ends 62', the connectors 64 and pulleys 66 illustrated in the first embodiment may not be required in the second embodiment. The push-bar 40 in the second implementation is similar to that in the first implementation, which is adjustable at least in the vertical direction relative to the ground surface and operable to lean the crop material 90 in a forward direction relative to the direction of operation V. The push-bar 40 is positioned rearward of the curtain 50 a pre-determined distance 45 to engage the curtain 50 in response to the curtain 50 moving rearward relative to the direction of operation V the pre-determined distance 45. In another implementation without the curtain (not shown), the push-bar 40 is positioned rearward of the forward end 222 a pre-determined distance (not shown) to engage the crop 90 directly when the cutter implement 10 travels in the direction of operation V. As such, the push-bar 40 provides a resistance against the crop 90 so as to lean the crop 90 forward.

It is noted that, in another implementation, the rod ends 62' of the actuators 60' do not have to extend or retract to move the push-bar 40 in an exact vertical direction relative to the ground surface. The direction of extension and extraction may have an offset angle relative to the exact vertical direction. As such, the push-bar 40 is not only adjustable in the vertical direction, but also adjustable forward or rearward relative to the direction of operation V. Those adjustments will affect the resistance from the curtain 50 or directly from the push-bar (not shown) against the crop 90.

The present disclosure further includes a crop pushing system 12. The crop pushing system 12 can be included in the cutter implement 10 in the first implementation. The crop pushing system 12 may include the push-bar 40, the actuators 60 having the rod ends 62, the connectors 64, the pulleys 66, the linear support element 70 having the first end 72 and second end 74, and optionally the curtain 50 as discussed in the first embodiment.

The present disclosure further includes a crop pushing system 12'. The crop pushing system 12' can be included in the cutter implement 10 in the second implementation. The crop pushing system 12' may include the push-bar 40, the actuators 60' having the rod ends 62', and optionally the curtain 50 as discussed in the second embodiment.

Without in any way limiting the scope, interpretation, or application of the claims appearing below, a technical effect of one or more of the example embodiments disclosed herein is to provide a push-bar operable to lean the crop material in a forward direction relative to the direction of operation, so as to obtain a better cutting or crop processing results. Another technical effect of one or more of the example embodiments disclosed herein is the aforementioned push-bar is adjustable in at least vertical direction relative to the ground surface so as to provide a resistance on the crop or increase a resistance of other elements such as a curtain, leaning the crop in a preferable extent for cutting and processing the crop material. Another technical effect of one or more of the example embodiments disclosed herein is to provide a crop pushing system, which can be applied to various types of cutter implements.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A cutter implement for cutting crop material, the cutter implement comprising:
    a housing having a forward end for engaging the crop material when moving in a direction of operation, wherein the housing at least partially defines a cutting region disposed at the forward end thereof;
    a cutter coupled to the housing and operable to cut the crop material in the cutting region;
    a push-bar positioned forward of the cutter relative to the direction of operation, wherein the push-bar is operable to lean the crop material in a forward direction relative to the direction of operation;
    an actuator coupled to the push-bar and operable to move the push-bar in the vertical direction;
    a connector interconnecting the actuator and the push-bar; and
    a pulley coupled to the housing and configured to re-direct the connector between the actuator and the push-bar;
    wherein the push-bar is adjustable in a vertical direction relative to a ground surface.

2. The cutter implement set forth in claim 1, further comprising a curtain coupled to the forward end of the housing and positioned forward of the push-bar relative to the direction of operation, with the curtain at least partially defining the cutting region.

3. The cutter implement set forth in claim 2, wherein the curtain is moveable in a rearward direction relative to the direction of operation.

4. The cutter implement set forth in claim 3, wherein the push-bar is positioned rearward of the curtain a pre-determined distance to engage the curtain in response to the curtain moving rearward relative to the direction of operation the pre-determined distance, such that the push-bar increases a resistance of the curtain against rearward movement after the curtain contacts the push-bar.

5. The cutter implement set forth in claim 1, wherein the actuator includes one of a hydraulic cylinder, an electric motor, a hydraulic motor, a pneumatic motor.

6. The cutter implement set forth in claim 1, wherein the housing includes an upper frame portion, a first lateral frame portion, and a second lateral frame portion, with the first lateral frame portion and the second lateral frame portion spaced apart from each other and disposed on opposing lateral sides of the housing relative to a central longitudinal axis of the housing.

7. The cutter implement set forth in claim 1, wherein the connector is one of a cable, a chain, a rod, or a bar.

8. The cutter implement set forth in claim 1, further comprising a linear support element interconnecting the housing and the push-bar and operable to restrict movement of the push-bar in a rearward direction relative to the direction of operation.

9. The cutter implement set forth in claim 8, wherein the linear support element includes a first end coupled to the housing adjacent the forward end thereof and forward of the push-bar relative to the direction of operation, and a second end coupled to the push-bar rearward of the first end relative to the direction of operation.

10. The cutter implement set forth in claim 8, wherein the linear support element includes one of a chain, a cable, a rod, a strap, or a bar.

11. The cutter implement set forth in claim 1, further comprising a crop processor positioned rearward of the cutter relative to the direction of operation and operable to condition cut crop material.

12. A crop pushing system for a cutter implement, the cutter implement including a housing and a cutter coupled to the housing and operable to cut the crop material, the system comprising:
    a push-bar operable to lean the crop material in a forward direction relative to a direction of operation;
    an actuator coupled to the push-bar and operable to move the push-bar in a vertical direction relative to a ground surface;
    a connector interconnecting the actuator and the push-bar; and
    a pulley coupled to the housing and configured to re-direct the connector between the actuator and the push-bar.

13. The crop pushing system set forth in claim 12, further comprising a curtain positioned forward of the push-bar relative to the direction of operation, with the curtain at least partially defining a cutting region.

14. The crop pushing system set forth in claim 13, wherein the curtain is moveable in a rearward direction relative to the direction of operation, the push-bar is positioned rearward of the curtain a pre-determined distance to engage the curtain in response to the curtain moving rearward relative to the direction of operation the pre-determined distance, such that the push-bar increases a resistance of the curtain against rearward movement after the curtain contacts the push-bar.

15. The crop pushing system set forth in claim 12, further comprising a linear support element attached to the push-bar and operable to restrict movement of the push-bar in a rearward direction relative to the direction of operation.

16. The crop pushing system set forth in claim 12, wherein the actuator is a hydraulic cylinder having a rod end connected to the push bar and configured to extend and retract to move the push bar in the vertical direction.

* * * * *